United States Patent [19]
Chew et al.

[11] Patent Number: 5,467,654
[45] Date of Patent: Nov. 21, 1995

[54] METHOD AND APPARATUS FOR DETERMINING THE OPERATING SPEED OF A RAIL VEHICLE

[75] Inventors: James P. Chew, Jeannette; Robert E. Hamilton, Girard, both of Pa.

[73] Assignee: Union Switch & Signal Inc., Pittsburgh, Pa.

[21] Appl. No.: 170,525

[22] Filed: Dec. 20, 1993

[51] Int. Cl.$^6$ .................................................. G01P 3/22
[52] U.S. Cl. ........................................ 73/514.39; 324/173
[58] Field of Search ..................... 73/518, 519; 324/173, 324/179

[56]  References Cited

U.S. PATENT DOCUMENTS

| | | | |
|---|---|---|---|
| 3,800,139 | 3/1974 | Clark . | |
| 4,126,047 | 11/1978 | Sethares et al. | 73/518 |
| 4,248,085 | 2/1981 | Coulthard | 73/861.06 |
| 4,297,548 | 10/1981 | Little . | |
| 4,563,646 | 6/1986 | Désormière | 324/244 |
| 4,847,555 | 7/1989 | Stammer et al. | 324/173 |
| 5,121,054 | 6/1992 | Phillips et al. | 324/173 |

OTHER PUBLICATIONS

P. RSE–15A8 of a Railway Signal Equipment Catalog distributed by Union Switch & Signal Inc., 5800 Corporate Drive, Pittsburgh, Pa. 15237, the Assignee of the present invention. The page bears a date of Apr. 1976.

Primary Examiner—Richard Chilcot
Assistant Examiner—Max H. Noori
Attorney, Agent, or Firm—Buchanan Ingersoll

[57]  ABSTRACT

The present invention provides a generally contactless method and apparatus for producing a speed reference for a rail vehicle which amenable to retrofit applications. The invention utilizes a laser source to direct a laser beam on a portion of the wheel and axle assembly of the rail vehicle. In presently preferred embodiments, the laser beam is directed on a tread or flange section of the vehicle wheel. The laser beam is believed to excite the molecules on the surface of the wheel in such a way that magnetic susceptibility is significantly increased. The increased magnetic susceptibility facilitates encoding of a magnetic signal by a magnetic encoding head. This magnetic signal may then be received after further rotation of the wheel by an angularly displaced magnetic receiving head. Processing circuitry is electrically connected to the magnetic encoding head and the magnetic receiving head to derive the speed reference based on the angular velocity and dimensions of the wheel. An erasing head may also be provided to remove the magnetic signal after detection by the receiving head.

19 Claims, 4 Drawing Sheets

METHOD AND APPARATUS FOR DETERMINING THE OPERATING SPEED OF A RAIL VEHICLE

BACKGROUND OF THE INVENTION

1. Field of the Invention

The present invention relates to techniques for measuring the speed of a vehicle traveling along a railway. More particularly, the invention relates to an apparatus and method for determining the speed of a rail vehicle based on a contactless technique for measuring the angular velocity of the vehicle wheel and axle assembly.

2. Description of the Prior Art

A common technique for measuring the speed of a railway vehicle involves mechanically coupling the shaft of an electrical generator to the end of one of the vehicle's axles. As the axle rotates, the generator produces a proportional output, which may be easily measured or recorded. This generator is commonly referred to in the art as an axle generator.

Typically, the axle generator is mounted to the outside of a journal box covering the otherwise exposed end of the axle. The journal box is an unsprung component in the vehicle suspension. As such, the axle generator and mounting components are subject to the severe shocks and vibrations imposed on the vehicle wheel and axle assembly. Additionally, when used on a diesel-electric locomotive, the axle bears the unsprung portion of the weight of the traction motor. As a result, the shock loads are especially high in this situation. Due to this severe operating environment, it is a common occurrence for bolts holding the axle generator to break or loosen, leading to axle generator failure. Electrical connections to the axle generator will also often become loose or disconnected.

Because the locomotive crew frequently has no other convenient method of speed measurement, failure of an axle generator may create an undesirable operating condition. Additionally, certain locomotives depend upon axle generator output to initiate "transition." The term "transition" refers no the operational changeover in which the electric motors of the locomotive are switched from being connected in series to being connected in parallel. Series connection is generally used at low speeds to provide high current, and thus high torque, to all of the motors. At higher speeds, parallel connection is utilized so that each motor is supplied with sufficient source voltage to exceed the rising counter electromotive force. If the locomotive depends upon the axle generator to initiate transition, it may be rendered inoperable by an axle generator failure.

Some modern locomotives are furnished with radar speed measurement equipment. These radar systems emit an electromagnetic signal which is reflected from stationary objects, such as railway ties, situates along the track route. The reflected radar signal is then received by the locomotive and processed to determine operating speed. While such systems are generally effective, they tend to be relatively expensive. Additionally, radar speed measurement systems are difficult to retrofit onto older locomotives.

SUMMARY OF THE INVENTION

The present invention provides a generally contactless method and apparatus for producing a reference indicative of the operating speed of a rail vehicle. The invention utilizes a laser source means to direct a laser beam on a portion of a vehicle wheel and axle assembly. The laser beam may excite molecules on the surface of illuminated portion such that magnetic susceptibility is significantly increased. This increased magnetic susceptibility facilitates encoding of a magnetic signal by appropriate magnetic encoding means. After further rotation of the wheel, this magnetic signal may be received by magnetic receiving means. Processing means then derive the speed reference based on the angular velocity of the wheel. Erasing means may also be provided to remove the magnetic signal after it has been detected.

In presently preferred embodiments the processing means includes the combination of timing means and speed reference means. The timing means determine a time differential between impression and receipt of the magnetic signal. The speed reference means then derive a signal representative of vehicle speed based on this time differential, the known dimensions of the wheel and the selected angular displacement between the magnetic encoding means and the magnetic receiving means.

An apparatus of the invention may be configured to permit measurement of vehicle speed in both forward and reverse directions. In such embodiments, the magnetic receiving means may comprise first and second magnetic receiving heads which are angularly displaced from the magnetic encoding means in opposite angular directions. The magnetic encoding means may also include a pair of angular displaced magnetic encoding heads. In one presently preferred embodiment, two magnetic encoding means are respectively placed on each side of the laser source means in the first and second opposite angular directions. Alternatively, a single magnetic encoding head may be utilized to impress the magnetic signal for both forward and reverse speed measurements.

The laser source means preferably includes a semiconductor laser diode operative to emit coherent light in the infrared region of the electromagnetic spectrum. In applications utilizing a single magnetic encoding head, the laser diode may be situated such that the laser beam illuminates a point on the wheel generally in radial alignment with the magnetic encoding head.

DETAILED DESCRIPTION OF PRESENTLY PREFERRED EMBODIMENTS

Figure 1:
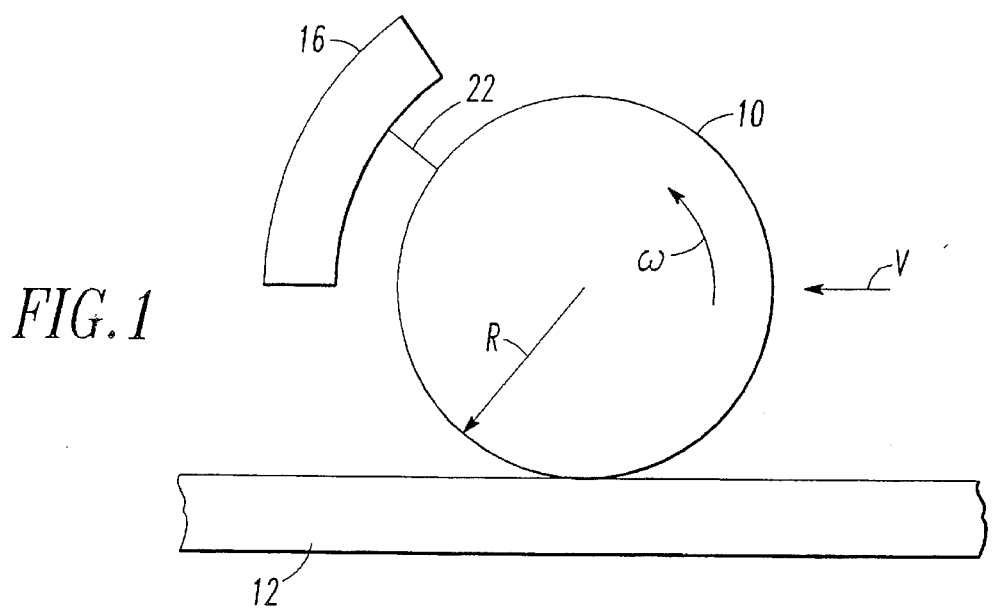
FIG. 1 is a diagrammatic representation illustrating measurement of vehicle speed according to the teachings of the present invention.
Figure 2:
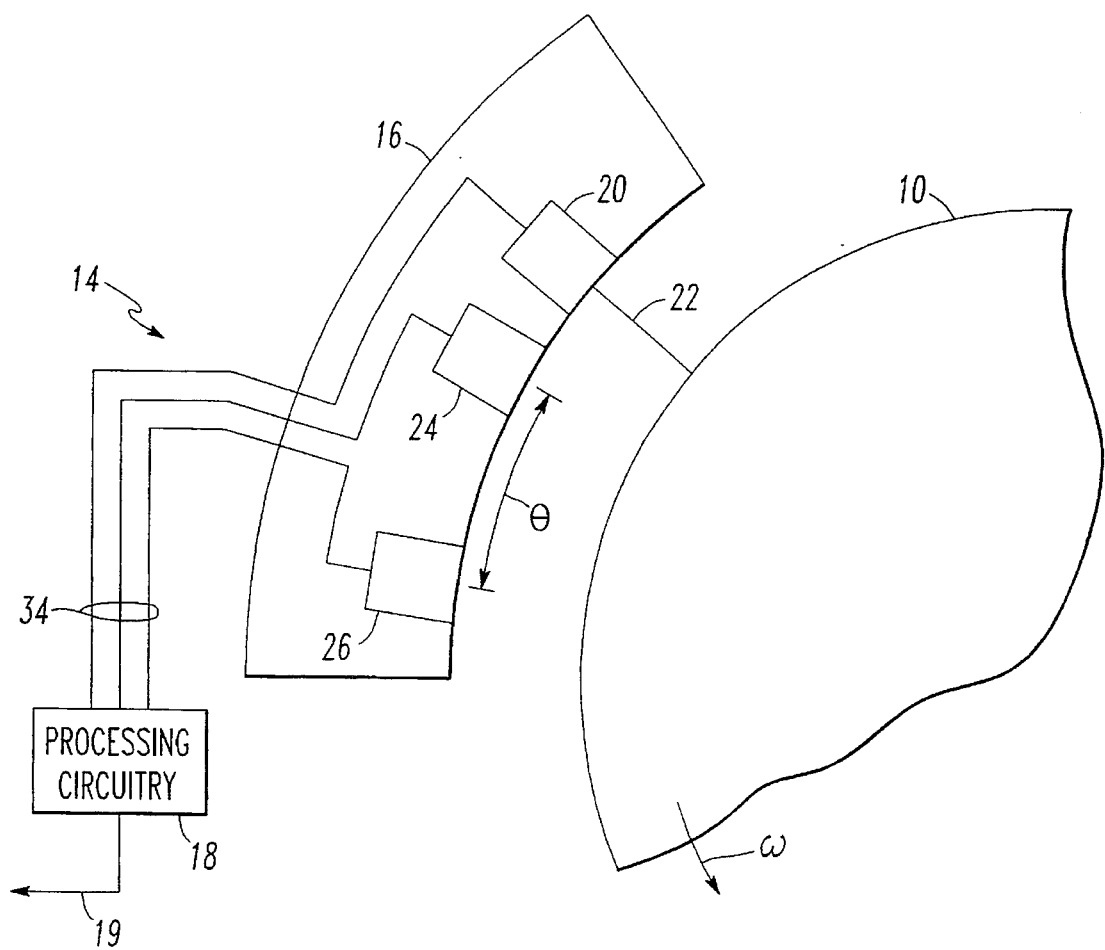
FIG. 2 is a diagrammatic view of one presently preferred embodiment of the apparatus of the present invention

FIG. 1 diagrammatically illustrates a wheel 10 of a rail vehicle traveling along a rail 12. Assuming no slip, the velocity V of the vehicle can be derived by the radius R (which can be predetermined) and angular velocity ω of wheel 10. As can be most clearly in FIG. 2, the invention provides an apparatus 14 to determine vehicle speed based on a measurement of the angular velocity ω. Apparatus 14 includes a measurement 16 placed in proximity to wheel 10. Processing circuitry 18 receives information from components of measurement unit 16 and produces a reference signal on output line 19 indicative of vehicle speed.

Measurement unit 16 includes a laser source 20 which directs a laser beam 22 onto a circumferential region of wheel 10 thereby defining a selected portion on wheel 10. In presently preferred embodiments, laser source 20 may be a relatively inexpensive semiconductor laser diode. A GaAs infrared laser diode is believed to be well-suited for this purpose. A magnetic encoding head 24, here placed in angular juxtaposition to laser source 20, impresses a selected magnetic signal into wheel 10. This magnetic signal is then received by a magnetic receiving head 26 which is angularly displaced from magnetic encoding head 24 by a known angle θ (as measured with respect to the center point of the wheel).

The wheel and axle assemblies of rail vehicles are constructed of materials, such as steel, which would generally have a magnetic susceptibility too low for effective contactless magnetic encoding. Magnetic susceptibility is a property of a material which describes the response of that material to a magnetic field, and is commonly defined as the ratio of magnetization, M, to magnetic field strength, H. The present invention enhances the magnetic susceptibility of the relevant portion of wheel 10 by selected exposure to electromagnetic radiation provided by laser source 20. Specifically, the laser beam 22 produced by laser source excites the molecules of $Fe_2O_3$ present on the surface of wheel 10 to change its crystal structure from hexagonal to cubic. As a result, magnetic susceptibility is significantly increased.

The use of the laser to enhance the magnetic qualities of the wheel may occur in a number of ways. As the laser is focused on the surface of the wheel it contacts a layer of iron oxide ($Fe_2O_3$) which has been formed by natural causes and conditions. This oxide layer is in a structure where the ends of the iron atoms and the three oxygen atoms are formed in a hexagonal shape. The laser beam is a point source of energy that raises the residual magnetism of the iron oxide at the point of focus. The action that transpires may be that the iron oxide crystal structure changes. The change in the general crystal structure may change from that of the hexagonal shape to that of a generally cubic shape. In a generally cubic shape the iron oxide may have some residual flux density and holds stable magnetization energy. The two iron atoms are then sharing one oxygen atom with an adjacent pair of iron atoms. Thus the magnetization energy may be increased to a level that the magnetization hysteresis loop is stable. This gives the surface of the wheel a stable and normal magnetization curve which is needed for the coding and processing circuitry to magnetically mark the wheel. It should be noted that generally only a molecular layer of $Fe_2O_3$ on the circumferential surface of wheel 10 may be effected by laser source 20. The macroscopic properties of wheel 10 therefore remain unchanged, as desired.

Figure 2A:
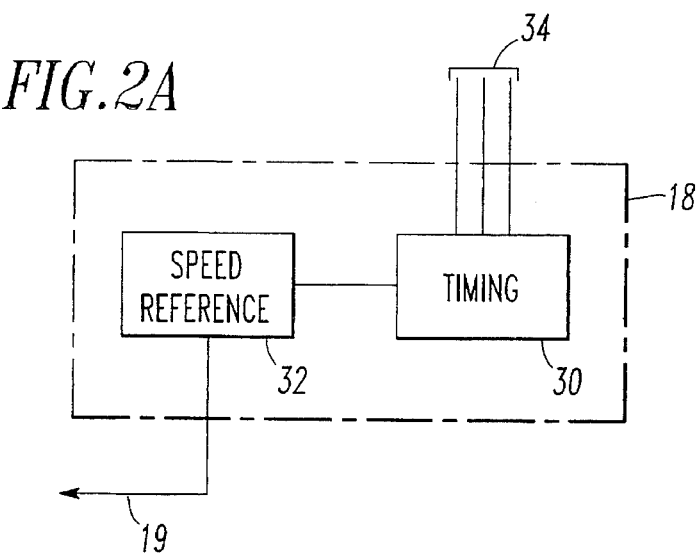
FIG. 2A is a block diagram of presently preferred processing circuitry for use with the apparatus shown in FIG. 2.

As shown in FIG. 2A, processing circuitry preferably 18 includes timing circuitry 30 and speed reference circuitry 32. Timing circuitry 30 is electrically connected to components within measurement unit 16 via connections collectively referenced as 34. Based on this information, circuitry 30 may determine a time differential between which the magnetic signal is impressed onto wheel 10 by magnetic encoding head 24 and subsequently received by magnetic receiving head 26. This time differential is then passed to speed reference circuitry 32. With appropriate knowledge of the radius R of wheel 10 and the angular displacement θ between heads 24 and 26, speed reference circuitry 32 produces the desired speed reference signal on output line 19. Preferably, processing circuitry 18 is capable of detecting the magnetic signal received by head 26 with a loss factor of at least approximately 30 dB. This is believed sufficient to compensate for dirt or grease which may accumulate on wheel 10 and heads 24 and 26. Processing circuitry for other measurement units described herein would generally be similar to processing circuitry 18.

Figure 3:
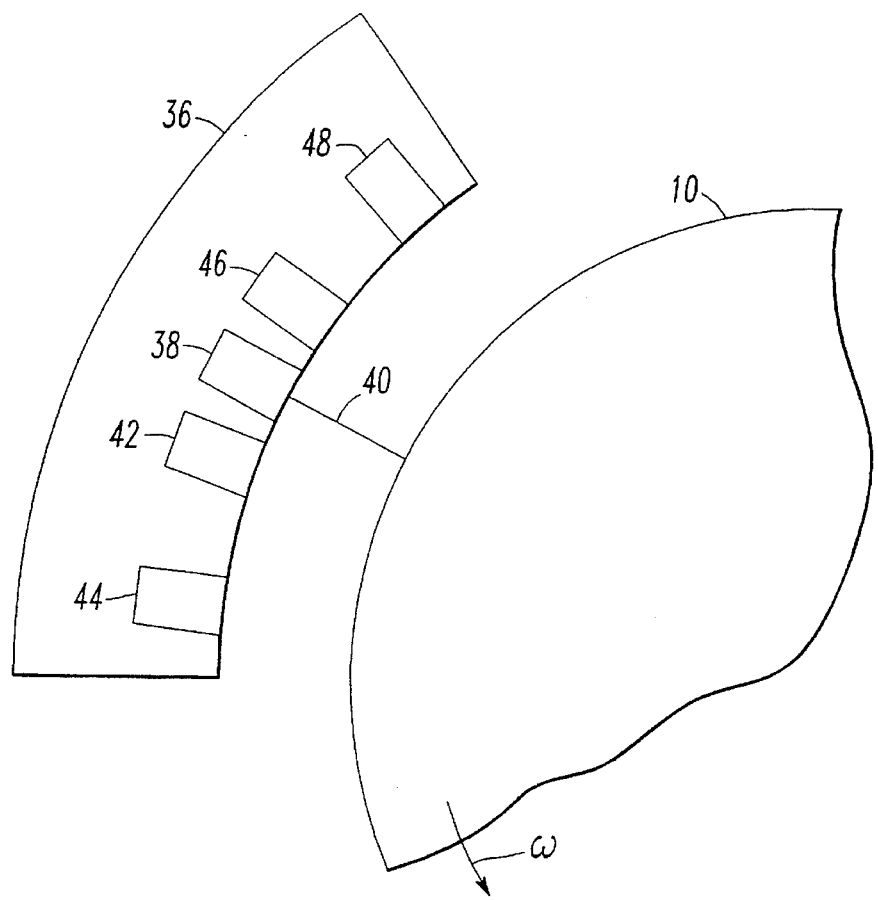
FIGS. 3 through 5 are diagrammatic representations, respectively, of alternative embodiments of the apparatus of the present invention.

In some applications, it may be desirable to detect vehicle speed in both forward and reverse directions of travel. FIG. 3 illustrates a measurement unit 36 which may be utilized for this purpose. As with measurement unit 16, measurement unit 36 includes a laser source 38 which illuminates a portion of wheel 10 with a laser beam 40. Measurement unit 36 also includes a magnetic encoding head 42 and a magnetic receiving head 44 to measure angular velocity of wheel 10 in a counterclockwise direction. These components are similar to heads 24 and 26 of unit 16. It can also be seen, however, that measurement unit 36 further includes a second magnetic encoding head 46 and second magnetic receiving head 48 situated to measure the angular velocity of wheel 10 in a clockwise direction. Based on the receipt of a magnetic signal by head 44 or head 48, the processing circuitry may easily be able to determine in which direction the vehicle is traveling as well as vehicle speed in that direction.

Figure 4:
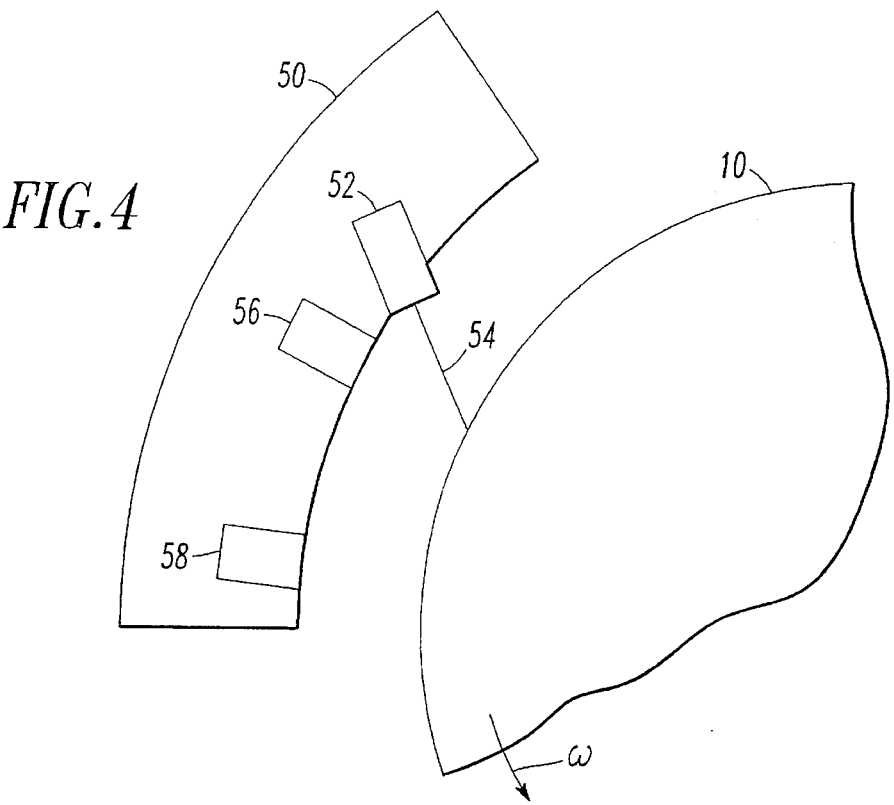

To ensure that the magnetic signal on wheel 10 is of sufficient magnitude for detection, it will generally be desirable to encode the magnetic signal soon after the molecular structure of wheel 10 has been altered for increased magnetic susceptibility. Toward this end, FIG. 4 illustrates a measurement unit 50 in which laser source 52 is situated somewhat differently from that described above. Specifically, laser source 52 is situated to direct its laser beam 54 at a point on wheel 10 generally in radial alignment (as determined by the center point of wheel 10) with magnetic encoding head 56. It can be seen that this configuration permits magnetic encoding head 56 to impress the magnetic signal a very short time after the molecular structure of the surface of wheel 10 has been changed by laser beam 54 to have improved magnetic suceptibility. The signal is then received by magnetic receiving head 58 as described above.

Figure 5:
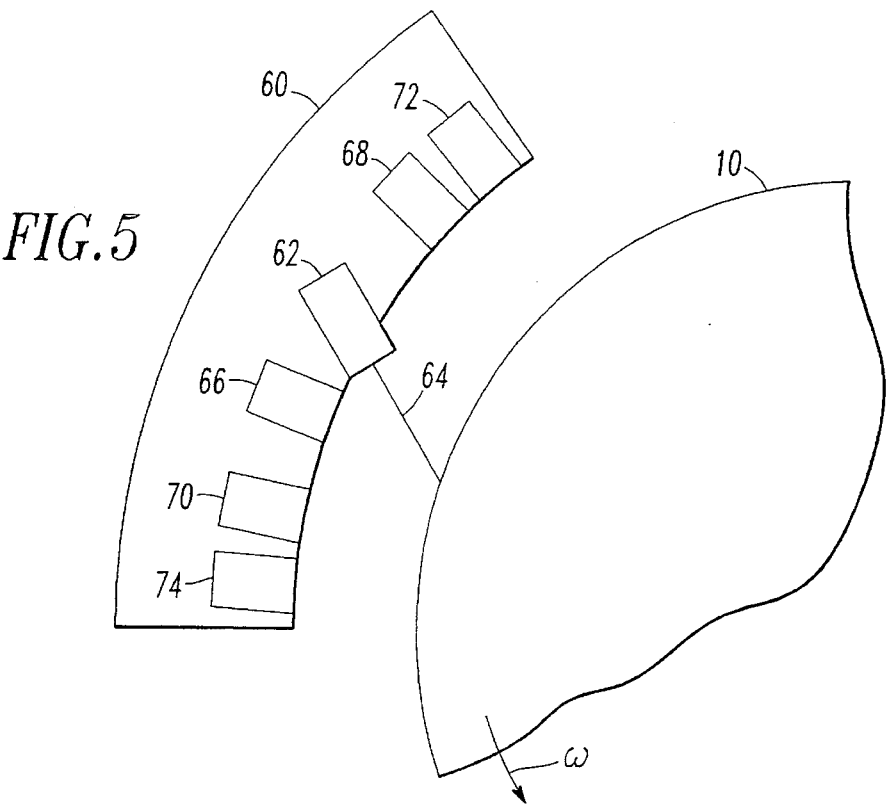

FIG. 5 illustrates a measurement unit 60 which, like measurement unit 50, has a laser source 62 situated to direct its laser beam 64 in radial alignment with magnetic encoding head 66. Measurement unit 60 further includes magnetic receiving heads 68 and 70 for measuring the angular velocity of wheel 10 in either a clockwise or counterclockwise direction, respectively. It should be noted that, unlike measurement unit 36, measurement unit 60 utilizes only a single magnetic encoding head 66 for vehicle speed measurements in either direction.

In embodiments in which the same magnetic signal will be utilized for consecutive speed measurements, it is generally desirable that the magnetic signal be removed from the surface of wheel 10 subsequent to each speed measurement reading. For this purpose, measurement unit 60 further includes erasing heads 72 and 74 angularly displaced from magnetic encoding means in the clockwise and counterclockwise directions, respectively. Erasing head 72 is situated outside of magnetic receiving heads 68 to remove the magnetic signal after receipt thereby. Similarly, erasing head 74 removes the magnetic signal read by magnetic receiving head 70.

Figure 6A:
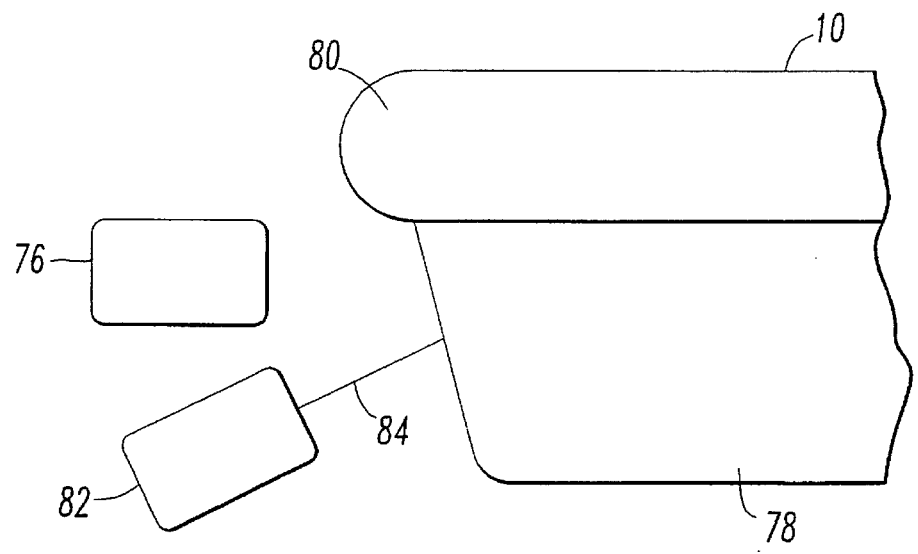
FIGS. 6A and 6B diagrammatically illustrate use of the wheel tread and wheel flange, respectively, for vehicle speed measurement according to the present invention.
Figure 6B:
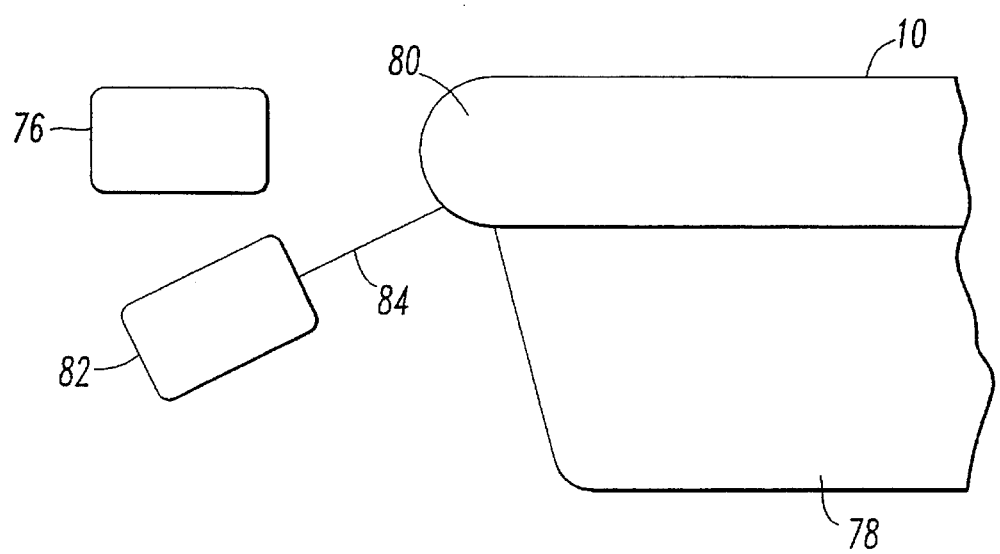

Depending on the exigencies of the particular application, it may be desirable to encode the magnetic signal on a different portions of wheel 10. FIGS. 6A and 6B illustrate a magnetic encoding head 76 impressing a magnetic signal on the tread region 78 and flange region 80 of wheel 10, respectively. As with the embodiments shown in FIGS. 4 and 5, laser source 82 is here situated to direct laser beam 84 to impinge the selected portion of wheel 10 at a point generally in radial alignment with magnetic encoding head 76. However, unlike the embodiments shown in FIGS. 4 and 5, laser source 82 is here placed generally in the same horizontal plane as magnetic encoding head 76. Therefore, the direction of arrival will be different although the point of arrival is the same.

It can thus can seen that the invention provides a unique apparatus and method of measuring speed measurement which has many advantages when compared with the prior art. For example, the system can be constructed with no moving parts. Since its use will eliminate a piece of rotating electrical equipment, maintenance costs should be reduced. As the hardware of this system may be mounted on the sprung side of the vehicle suspension, it will be subjected to less severe shocks and vibrations then are present on the wheel and axle assembly. Also, this system could be easily retrofit to many different types of railway equipment, including railway equipment having inboard journals. Mounting an axle generator of the prior art to such equipment with inboard journals has been difficult. Additionally, installation of a conventional axle generator has required a splined axle, whereas installation of this system would not.

While presently preferred embodiments of the invention and presently preferred methods of practicing the same have been shown and described, it is to be distinctly understood that the invention is not limited thereto but may be otherwise variously embodied and practiced within the scope of the following claims.

We claim:

1. Apparatus for producing a speed reference for a rail vehicle having a rotatable wheel and axle assembly, said apparatus comprising:

laser source means for directing a laser beam on a selected portion of said rotatable wheel and axle assembly said laser beam defining said selected portion;

magnetic encoding means for impressing a magnetic signal on said selected portion of said rotatable wheel and axle assembly;

magnetic receiving means displaced from said magnetic encoding means by a selected angular displacement for detecting the presence of selected portion; and processing means in electrical communication with said magnetic encoding means and said magnetic receiving means for deriving said speed reference based on an angular velocity of said selected portion of said rotatable wheel and axle assembly.

2. The apparatus of claim 1 wherein said selected portion of said rotatable wheel and axle is a vehicle wheel and said processing means comprises:

timing means for determining a time differential between a first time in which said magnetic encoding means impresses said magnetic signal and a second time in which said magnetic receiving means detects said magnetic signal; and speed reference means for deriving a signal representative of said speed of the rail vehicle based on said time differential, the selected angular displacement between said magnetic encoding means and said magnetic receiving means and predetermined dimensions of said rotatable wheel.

3. Apparatus for producing a speed reference for a rail vehicle having a rotatable wheel and axle assembly, said apparatus comprising:

laser source means for directing a laser beam on a selected portion of said rotatable wheel and axle assembly;

magnetic encoding means for impressing a magnetic signal on said selected portion of said rotatable wheel and axle assembly;

magnetic receiving means displaced from said magnetic encoding means by a selected angular displacement for detecting the presence of said selected portion;

processing means in electrical communication with said magnetic encoding means and said magnetic receiving means for deriving said speed reference based on an angular velocity of said selected portion of said rotatable wheel and axle assembly; and erasing means angularly displaced from said magnetic receiving means for removing said magnetic signal from said selected portion of said rotatable wheel after the presence of said selected portion is detected by said magnetic receiving means.

4. The apparatus of claim 1 wherein said laser source means is situated to direct said laser beam to illuminate said rotatable wheel at a point generally in radial alignment with said magnetic encoding means.

5. The apparatus of claim 4 wherein said laser source means is situated generally adjacent to said encoding means.

6. The apparatus of claim 5 wherein said laser source means and said encoding means are situated in angular juxtaposition.

7. The apparatus of claim 5 wherein said laser source means is situated laterally of said encoding means.

8. The apparatus of claim 4 wherein said magnetic receiving means comprises:

a first magnetic receiving head angularly displaced from said magnetic encoding means in a first angular direction;

a second magnetic receiving head angularly displaced from said magnetic encoding means-in a second angular direction opposite said first angular direction; and whereby said apparatus is capable of determining said speed reference when said rail vehicle moves in forward and a reverse direction.

9. Apparatus for producing a speed reference for a rail vehicle having a rotatable wheel and axle assembly, said apparatus comprising:

laser source means for directing a laser beam on a selected portion of said rotatable wheel and axle assembly, wherein said laser source means is situated to direct said laser beam to illuminate said rotatable wheel at a point generally in radial alignment with said magnetic encoding means;

magnetic encoding means for impressing a magnetic signal on said selected portion of said rotatable wheel and axle assembly;

magnetic receiving means displaced from said magnetic encoding means by a selected angular displacement for detecting the presence of said selected portion, said magnetic receiving means including a first magnetic receiving head angularly displaced from said magnetic encoding means in a first angular direction, a second magnetic receiving head angularly displaced from said magnetic encoding means in a second angular direction opposite said first angular direction, and whereby said apparatus is capable of determining said speed reference when said rail vehicle moves in forward and a reverse direction;

processing means in electrical communication with said magnetic encoding means and said magnetic receiving means for deriving said speed reference based on an angular velocity of said selected portion of said rotatable wheel and axle assembly; and erasing means for removing said magnetic signal from said selected portion of said rotatable wheel after the presence of said selected portion is detected by said magnetic receiving means.

10. The apparatus of claim 9 wherein said erasing means comprises:

a first erasing head angularly displaced from said magnetic encoding means in said first angular direction;

a second erasing head angularly displaced from said magnetic encoding means in said second angular direction;

wherein said firs% erasing head and said second erasing head are respectively situated outside of said first magnetic receiving head and said second magnetic receiving head with respect to said laser source means.

11. The apparatus of claim 1 wherein:

said magnetic encoding means includes a first magnetic encoding head and a second magnetic encoding head displaced from said laser source means in respective first and second opposite angular directions;

said magnetic receiving means comprises a first and a second magnetic receiving head displaced from said laser source means in said first and second opposite angular directions, respectively; and wherein said first magnetic receiving head and said second magnetic receiving head are respectively situated outside of said first magnetic encoding head and said second magnetic encoding head with respect to said laser source means.

12. Apparatus for producing a speed reference for a rail vehicle having a rotatable wheel and axle assembly, said apparatus comprising:

laser source means for directing a laser beam on a selected portion of said rotatable wheel and axle assembly;

magnetic encoding means for impressing a magnetic signal on said selected portion of said rotatable wheel and axle assembly;

magnetic receiving means displaced from said magnetic encoding means by a selected angular displacement for detecting the presence of said selected portion;

processing means in electrical communication with said magnetic encoding means and said magnetic receiving means for deriving said speed reference based on an angular velocity of said selected portion of said rotatable wheel and axle assembly;

said magnetic encoding means includes a first magnetic encoding head and a second magnetic encoding head displaced from said laser source means in respective first and second opposite angular directions;

said magnetic receiving means comprises a first and a second magnetic receiving head displaced from said laser source means in said first and second opposite angular directions, respectively;

wherein said first magnetic receiving head and said second magnetic receiving head are respectively situated outside of said first magnetic encoding head and said second magnetic encoding head with respect to said laser source means; and erasing means for removing said magnetic signal from said selected portion of the rotating wheel after the presence of said selected portion is detected by said magnetic receiving means.

13. The apparatus of claim 12 wherein said erasing means comprises:

a first erasing head angularly displaced from said magnetic encoding means in said first angular direction;

a second erasing head angularly displaced from said magnetic encoding means in said second angular direction;

wherein said first erasing head and said second erasing head are respectively situated outside of said first magnetic receiving head and said second magnetic receiving head with respect to said laser source means.

14. The apparatus of claim 13 wherein said laser source means includes a semiconductor laser diode operative to primarily emit infrared light.

15. A method of determining an operating speed of a rail vehicle, said method comprising the following steps:

(a) directing a laser beam on a portion of a rotatable wheel and axle assembly of the rail vehicle to form an enhanced magnetically susceptible area thereof;

(b) impressing a preselected magnetic signal on said magnetically susceptible area;

(c) detecting the magnetic signal from said magnetically susceptible area during further rotation of said rotatable wheel and axle assembly;

(d) deriving the operating speed of said rail vehicle based on a time differential between a first time when said magnetic signal is impressed on said magnetically susceptible area and a second time when the magnetic signal is detected from said magnetically susceptible area.

16. The method of claim 15 wherein said laser beam is directed in step (a) at a location generally on a tread region of a wheel of said rail vehicle.

17. The method of claim 15 wherein said laser beam is directed in step (a) at a location generally on a flange region of a wheel of said rail vehicle.

18. A method of determining an operating speed of a rail vehicle, said method comprising the following steps:

(a) directing a laser beam on a portion of a rotatable wheel and axle assembly of the rail vehicle to form an enhanced magnetically susceptible area thereof;

(b) impressing a preselected magnetic signal on said magnetically susceptible area;

(c) detecting the magnetic signal from said magnetically susceptible area during further rotation of said rotatable wheel and axle assembly;

(d) deriving the operating speed of said rail vehicle based on a time differential between a first time when said magnetic signal is impressed on said magnetically susceptible area and a second time when the magnetic signal is detected from said magnetically susceptible area; and (e) erasing said magnetic signal from said enhanced magnetically susceptible area.

19. The method of claim 15 wherein the laser beam is continuously illuminated in step (a) during a full rotation of the rotatable wheel and axle assembly.

* * * * *

UNITED STATES PATENT AND TRADEMARK OFFICE
CERTIFICATE OF CORRECTION

PATENT NO. : 5,467,654
DATED : November 21, 1995
INVENTOR(S) : JAMES P. CHEW, ROBERT E. HAMILTON It is certified that error appears in the above-indentified patent and that said Letters Patent is hereby corrected as shown below:

Column 7, line 21, claim 10, change "firs%" to --first--.

Signed and Sealed this

Sixteenth Day of April, 1996

BRUCE LEHMAN

*Attest:*

*Attesting Officer*          Commissioner of Patents and Trademarks